(12) United States Patent
Xu et al.

(10) Patent No.: US 9,160,540 B2
(45) Date of Patent: Oct. 13, 2015

(54) PREVENTING PLAYBACK OF STREAMING VIDEO IF ADS ARE REMOVED

(71) Applicant: Adobe Systems Incorporated, San Jose, CA (US)

(72) Inventors: Xuejun Xu, Cupertino, CA (US); Dwight Rodgers, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 132 days.

(21) Appl. No.: 13/950,552

(22) Filed: Jul. 25, 2013

(65) Prior Publication Data

US 2015/0033023 A1    Jan. 29, 2015

(51) Int. Cl.
*H04L 9/32* (2006.01)
*H04N 7/167* (2011.01)

(52) U.S. Cl.
CPC .................................. *H04L 9/3247* (2013.01)

(58) Field of Classification Search
CPC ............. H04L 9/3281; H04N 21/8358; H04N 1/32144; H04N 201/3233; G11B 20/00086
See application file for complete search history.

(56) References Cited

U.S. PATENT DOCUMENTS

| | | | |
|---|---|---|---|
| 6,931,536 B2* | 8/2005 | Hollar | 713/176 |
| 7,760,876 B2* | 7/2010 | Kocher et al. | 380/202 |
| 7,802,311 B2* | 9/2010 | Muraki et al. | 726/31 |
| 8,688,991 B1* | 4/2014 | Sunil | 713/176 |
| 2002/0184537 A1* | 12/2002 | Inokuchi et al. | 713/202 |
| 2003/0046537 A1* | 3/2003 | Smith | 713/161 |
| 2004/0039926 A1* | 2/2004 | Lambert | 713/189 |
| 2006/0174126 A1* | 8/2006 | Crandall et al. | 713/176 |
| 2006/0236097 A1* | 10/2006 | Prologo et al. | 713/156 |
| 2011/0107108 A1* | 5/2011 | Hirai | 713/189 |
| 2011/0252118 A1* | 10/2011 | Pantos et al. | 709/219 |
| 2011/0271092 A1* | 11/2011 | Brelay et al. | 713/150 |
| 2013/0219178 A1* | 8/2013 | Xiques et al. | 713/168 |
| 2013/0268963 A1* | 10/2013 | Nugent et al. | 725/32 |

OTHER PUBLICATIONS

Pantos, R., "HTTP Live Streaming", May 1, 2009, pp. 1-17.*

* cited by examiner

*Primary Examiner* — Yonas Bayou
(74) *Attorney, Agent, or Firm* — Finch & Maloney PLLC

(57) ABSTRACT

A digitally signed manifest file includes metadata that specifies whether a policy regarding the digital signature should be enforced. The policy is then used to generate additional metadata associated with the program and ad content of the video stream. The metadata is tamper resistant so that any modification or removal of the metadata will prevent the video stream from playing. If the metadata indicates that the policy should be enforced, the digital signature of the manifest is verified by the client, and an invalid or missing signature prevents the video stream from being played back. The metadata defines which media players are allowed and/or not allowed to play back a video stream, including media players that are configured to skip or remove ads, and/or includes an encryption key identifier for verifying the digital signature. The ad content is digitally signed to prevent modification or replacement of the ad content.

20 Claims, 4 Drawing Sheets

… (1)

PREVENTING PLAYBACK OF STREAMING VIDEO IF ADS ARE REMOVED

FIELD OF THE DISCLOSURE

This disclosure relates generally to digital media, and more particularly, to techniques for preventing the playback of a video stream if advertisements are removed.

BACKGROUND

Streaming video is a form of multimedia that is presented to a user while being delivered by a provider, as distinguished from simple file transfer, which involves receiving the entire video content before playing it back. HTTP Live Streaming (HLS), HTTP Dynamic Streaming (HDS), and Dynamic Adaptive Streaming over HTTP (DASH) are examples of standard protocols for streaming multimedia over the Internet from HTTP web servers. Using these protocols, the video content is broken into a series of HTTP-based file segments. Some segments can include program content provided by one provider, and other segments can include advertisements provided by the same or a different provider.

DETAILED DESCRIPTION

Figure 1:
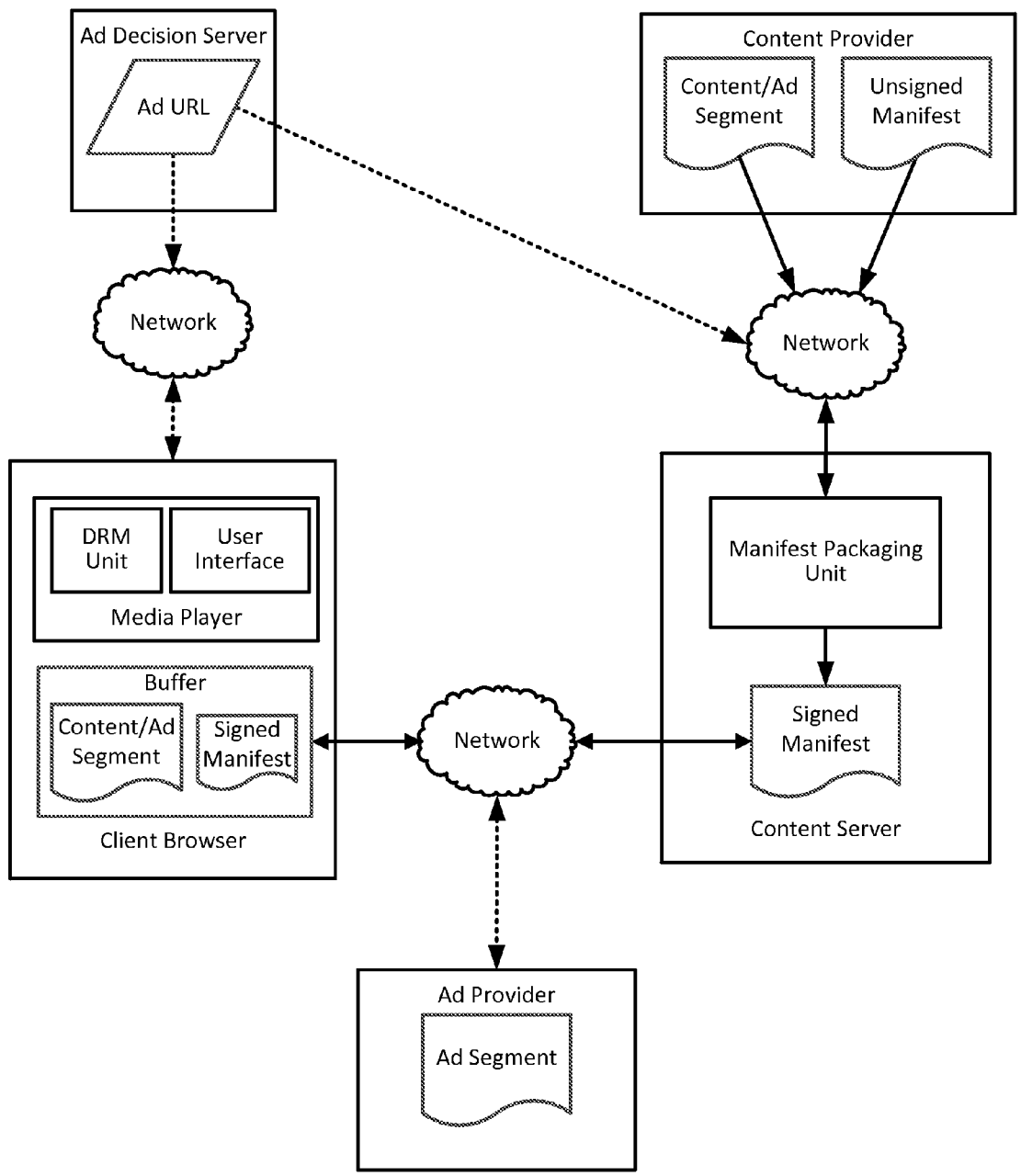
FIG. 1 illustrates an example digital media processing system configured in accordance with an embodiment of the present invention.

Various embodiments are directed to techniques for preventing the playback of a video stream if any ads are removed or the video stream is otherwise tampered with. In some embodiments, a manifest file associated with a video stream is digitally signed by a server, and the manifest includes an encryption key identifier associated with the digital signature. The digital signature of the manifest is verified by the client using the encryption key identifier, and an invalid or missing signature prevents the video stream from being played back. In some embodiments, the manifest file can be used to restrict the use of various media players, including media players that are configured to skip or remove ads in the video stream. In some embodiments, ad content or ad insertion instructions can be digitally signed to prevent removal or substitution of ads in the video stream. Numerous configurations and variations will be apparent in light of this disclosure.

General Overview

As previously mentioned, with certain HTTP protocols, a video stream is not broadcast continuously from beginning to end, but rather as a series of discrete video segments containing program content and, in some cases, ads. A manifest file contains references to each of the discrete video segments, and is used by a media player to retrieve and play back each segment in a particular sequence. In some cases, the manifest file may contain ad insertion instructions for retrieving the ad content from a different source than the video content. It is possible to intercept the manifest file for an unprotected video stream to remove or modify any of the segments or ad insertion instructions. For instance, a user may wish to skip over the ad segments during playback if viewing the ads is not of interest. This may be accomplished, for example, by replacing an ad segment in the manifest with an empty (e.g., zero-byte) segment or a segment containing different content, by removing the ad segment from the manifest, by modifying the ad insertion instructions, or by using a media player configured to skip ad segments or ignore ad insertion instructions in the manifest. However, according to various embodiments, it is appreciated that the advertiser and/or content provider may wish to prevent the removing or skipping of ads in the video stream to protect ad-based revenue, as well as malicious manipulation of the manifest file.

Thus, and in accordance with at least one embodiment of the present invention, a digitally signed manifest file includes digital rights management (DRM) metadata that specifies whether a DRM policy regarding the digital signature should be enforced. The policy is then used to generate additional metadata associated with the program and ad content of the video stream. The metadata is tamper resistant so that any modification or removal of the metadata will prevent the video stream from playing. If the metadata indicates that the DRM policy should be enforced, the digital signature of the manifest is verified by the client, and an invalid or missing signature prevents the video stream from being played back. In various embodiments, the metadata defines which media players are allowed and/or not allowed to play back a video stream, including media players that are configured to skip or remove ads in the video stream, and/or includes an encryption key identifier for verifying the digital signature. In some embodiments, the ad content is digitally signed to prevent modification or replacement of the ad content. These and other embodiments will be described in further detail with respect to the drawings.

System Architecture

FIG. 1 is an example block diagram illustrating various principles associated with an embodiment of the present invention. As discussed above, one technique for broadcasting multimedia content over the Internet using a standard HTTP protocol involves breaking the video stream into a series of segments. In this example, a content server is configured to interact electronically, via a network, with a content provider to receive a video stream including program content segments along with a corresponding unsigned manifest file. In some cases, the content provider also sends ad segments to the content server, although it will be understood that in some embodiments the ad segments can come from other sources, such as an ad provider or other third party, using ad insertion instructions, also referred to as ad cues. In any case, the unsigned manifest identifies each of the content segments and ad segments or ad cues in the video stream.

The content server includes a manifest packaging unit for converting the unsigned manifest into a signed manifest and encrypting the various segments, as will be discussed in further detail below. A client browser (e.g., Microsoft Internet Explorer®, Mozilla Firefox®, Safari®, Google Chrome®, and Opera®) is configured to interact electronically, via the network, with the content server to receive the encrypted segments and the signed manifest. The client browser includes or interacts with a media player, and a buffer or data storage for storing the segments and the signed manifest. The media player includes a digital rights management (DRM) unit for processing the segments and the signed manifest, and a user interface configured to play back the various segments in the video stream. When ad cues are used in the manifest, an ad decision server resolves each ad cue into a link, such as a uniform resource locator (URL), directing the media player to, for example, retrieve an ad segment provided by the ad provider.

It will be appreciated that, in some embodiments, various functions performed by the client browser, media player, user interface, buffer, and manifest packaging unit, as described herein, can performed by similar processors and/or databases in different configurations and arrangements, and that the depicted embodiments are not intended to be limiting. Various components of this example embodiment can be implemented in software, hardware, firmware or any combination thereof, and may be integrated into, for example, one or more desktop or laptop computers, workstations, servers, Internet-enabled televisions, tablets, smartphones, game consoles, set-top boxes, or other such computing devices. Note that the modularity may vary from one embodiment to the next with the overall functionality remaining as variously described herein. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. The network can be any communications network, such as a user's local area network and/or the Internet, or any other public and/or private communication network (e.g., local and/or wide area network of a company, etc.).

Example Manifest File

Figure 2:
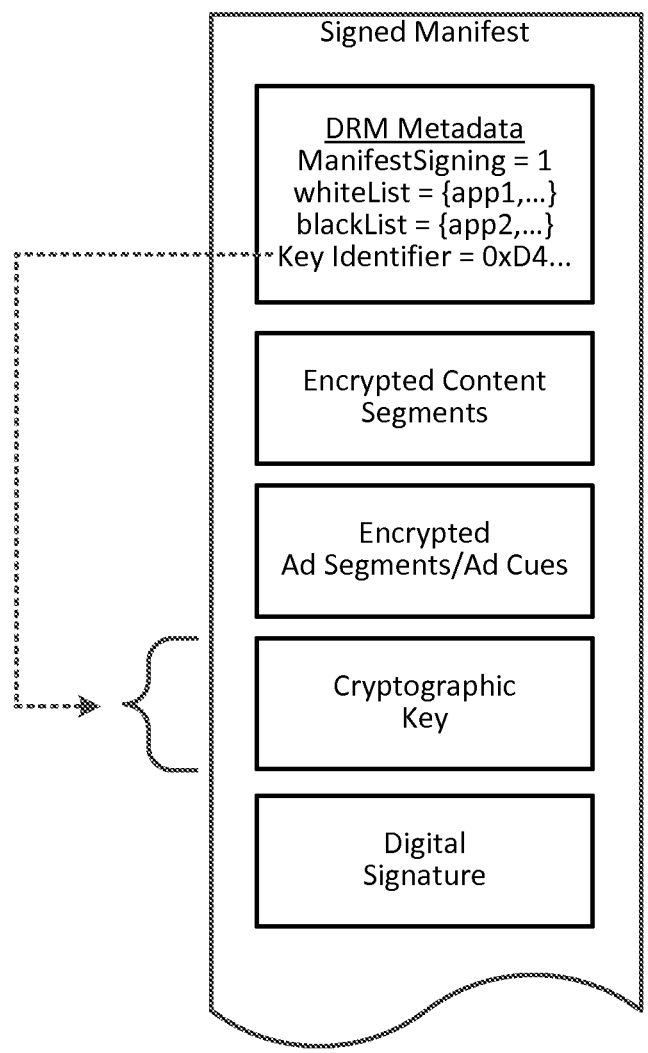
FIG. 2 illustrates an example manifest file in accordance with an embodiment of the present invention.

FIG. 2 illustrates one example of a signed manifest file, according to an embodiment. As discussed above, the manifest file is used to reference a series of content and ad segments in a particular video stream. In operation, the manifest packaging unit of FIG. 1 converts the unsigned manifest file provided by the content provider into a signed manifest file. The signed manifest file includes DRM metadata, for example, at the beginning of the file. The DRM metadata indicates whether manifest signing should be enforced by the media player. This can be done by creating a policy that has a custom property indicating whether manifest signing should be enforced; for example, ManifestSigning=1 or ManifestSigning=0. The DRM metadata specifies which media player application(s) are allowed or not allowed to play back the video stream, for example, using a whitelist and/or blacklist. Examples of media players that may not be allowed to play back the video stream are players that skip or remove ads.

The manifest file is digitally signed with a cryptographic key (e.g., an RSA (Rivest Shamir Adleman) private key). A digital signature is calculated for each manifest file that is served via the content server, including during live video streaming. The digital signature may be placed, for example, at the end of the manifest file. The DRM metadata includes a key identifier associated with the cryptographic key. The key identifier can be used to make sure that, during validation, the cryptographic key matches the digital signature. Also included in the signed manifest are encrypted content segments. The DRM metadata is tamper resistant, which prevents modification of the information inside the metadata. Further, no media player will be able to play the content in the video stream if the DRM metadata is removed from the manifest file, since the metadata includes information needed to decrypt each segment of the video stream. In some embodiments, the manifest also includes encrypted ad segments or encrypted ad cues, and/or a cryptographic key for use in verifying the digital signature and decrypting the content and ad segments.

The following is one example of the contents of a digitally signed m3u8 manifest file for HLS:

```
#EXTM3U
#EXT-X-TARGETDURATION:10
#EXT-X-MEDIA-SEQUENCE:1
#EXT-X-FAXS-CM:MIIUMQYJKoZIhvcNAQcCoIIUIjCCFB4CAQEx.....
#EXT-X-KEY:METHOD=AES-128,URI="faxs://keyserver.com?LICID=0x123456789"
#EXTINF:10,
http://content.com/streamingvideo-en2/bbb_iPhone_16-9_WIFI_640kbps-00001.en.ts
#EXT-X-CUE:TYPE="SpliceOut",ID="1",DURATION="60.0",TIME="266.198",PROGRAM-ID="138",AVAIL-NUM="0",AVAILS-EXPECTED="0"
#EXT-X-FAXS-PACKAGINGCERT:MIIUMQYJKoZIhvcNAQcCoIIUIjCCFB4CAQEx.....
#EXT-X-FAXS-SIGNATURE:VERSION=1,SignatureValue=M87777JHYTTYJKoZI....
#EXT-X-ENDLIST
```

The following is an example of the contents of a digitally signed Flash Media Manifest (F4M) manifest file:

```
<manifest>
...
<cueInfo id="c1234"> <cue autoReturn="false" avail="0" availsExpected="0" duration="60000"
id="1" type="SpliceOut" spliceTime="266.198" time="255020" uniqueProgramId="138"/><cueInfo>
...
<Signature version="1">
<PackagingCert>MIIUMQYJKoZIhvcNAQcCoIIUIJIjCCFB4CAQEx</PackagingCert>
<SignatureValue>M87777JHYTTYJKoZI....</SignatureValue> </Signature> </manifest>
```

Example Methodologies

Figure 3:
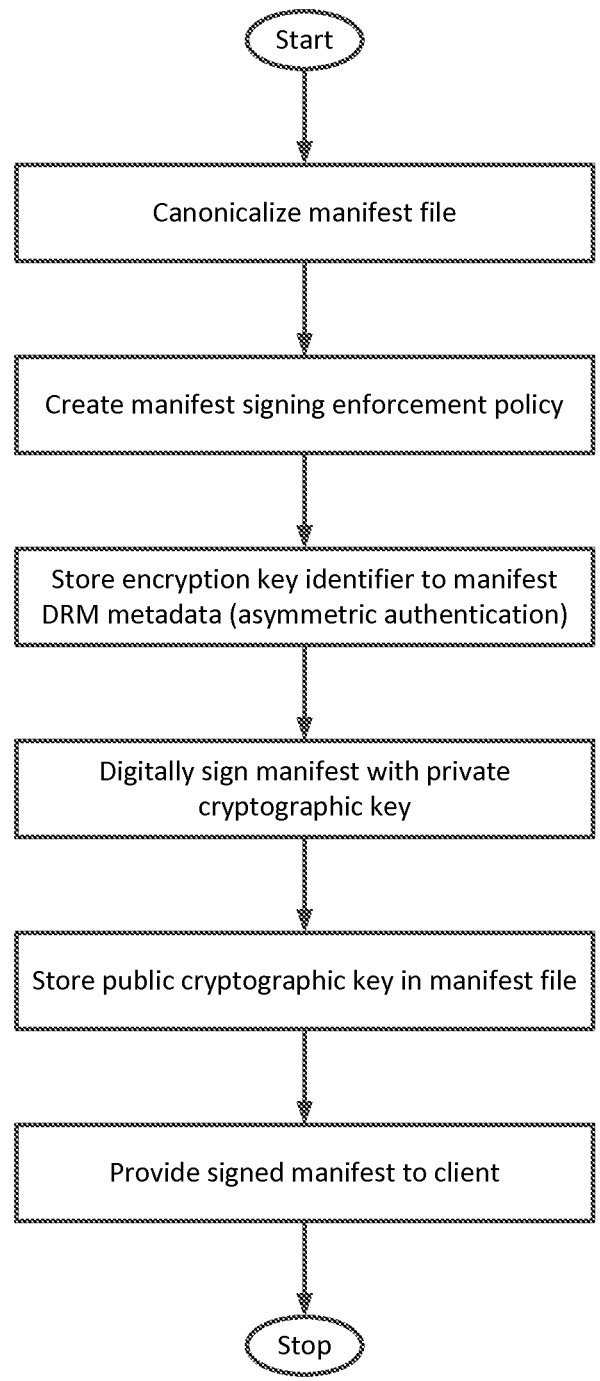
FIG. 3 illustrates an example digital media processing methodology configured in accordance with an embodiment of the present invention.

FIG. 3 illustrates an example methodology for creating a signed manifest file, in accordance with an embodiment. The signed manifest file can be created using an asymmetric key, such as an RSA key. However, it will be understood that other types of cryptography may be used, such as a symmetric key (e.g., keyed-hash message authentication code or HMAC) to create the digital signature. The method begins by canonicalizing the unsigned manifest file (e.g., removing white space, etc.). Next, a manifest signing enforcement policy is created (e.g., to indicate to the medial player whether the manifest file includes a digital signature). In some cases, the manifest signer is different than the content provider. Also, it is not desirable to allow an intervening user with RSA keys to sign the manifest file, or to remove the original signature and sign with different RSA keys. To provide strong binding between the content provider and its signing credential, a cryptographic key identifier (e.g., an RSA key identifier) is added to the DRM metadata, as shown in the example manifest file of FIG. 2. During validation by the media player, the digital signature is matched with the cryptographic key identifier in the DRM metadata. The key identifier may, for example, be specified in the policy custom property (e.g., CertID= 0x11223344556677889900112233445566778899900). Next, a digital signature is generated using, for example, an RSA private key. The digital signature and, if using an asymmetric key, an RSA public key, are stored in the manifest file, which may, for example, be provided to the client browser of FIG. 1.

Figure 4:
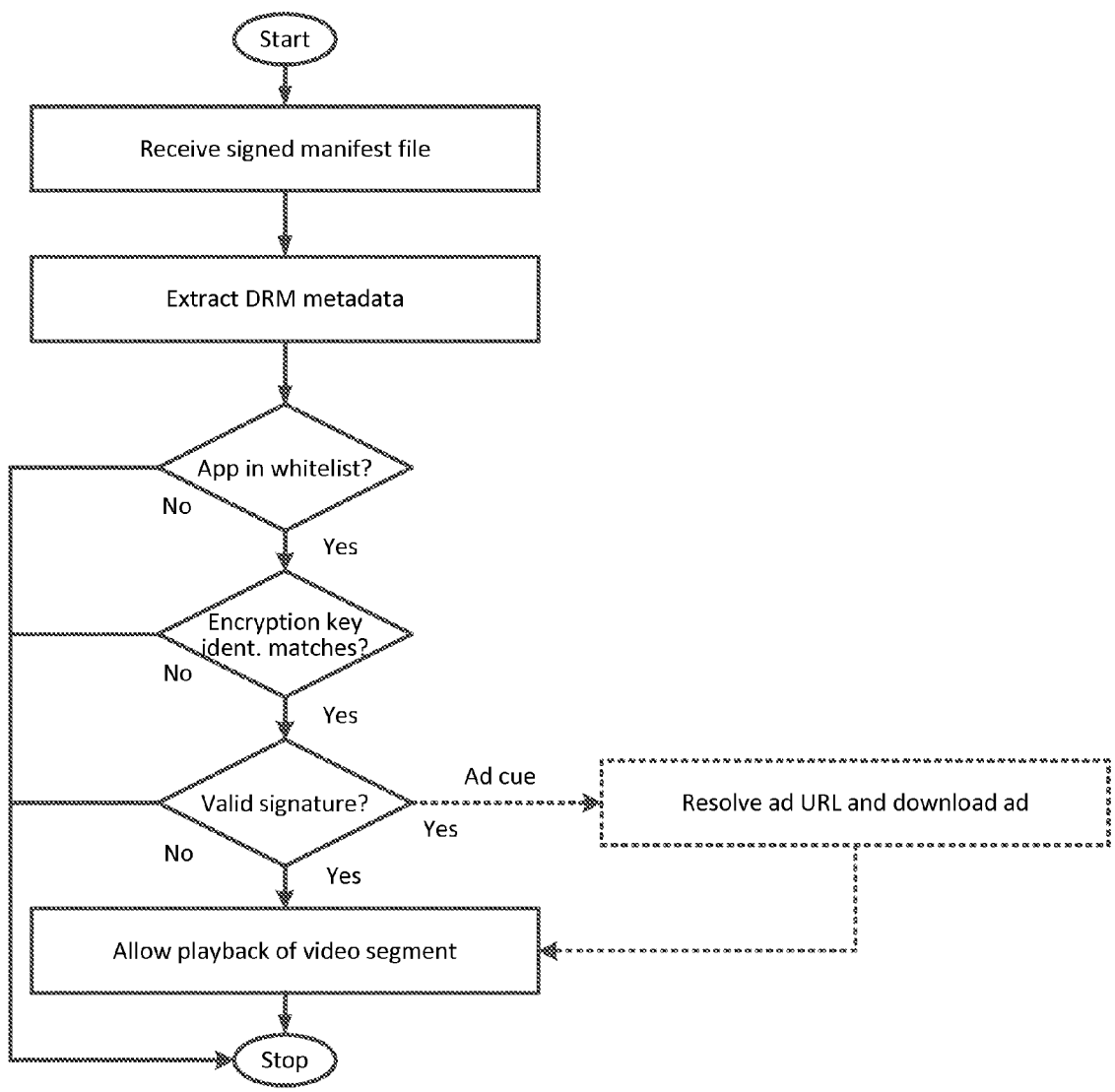
FIG. 4 illustrates another example digital media processing methodology configured in accordance with an embodiment of the present invention.

FIG. 4 illustrates a methodology for digital media processing by a client browser, such as the client browser of FIG. 1. First, the client browser receives the signed manifest file from the content server, and the DRM metadata is extracted from the manifest by the DRM unit. The metadata includes the policy information (e.g., the ManifestSigning property and the encryption key identifier). Next, the DRM unit determines whether the media player is on the whitelist or blacklist, if any. If the media player is on the blacklist, the video stream is not played back. Otherwise, the DRM unit determines whether the cryptographic key identifier matches the key identifier in the DRM metadata. If the key identifiers do not match, the video stream is not played back. Otherwise, the DRM unit validates the digital signature using the public cryptographic key in the manifest file (if any, otherwise, a private key held by the DRM unit may be used). If the digital signature is not valid, the video stream is not played back. Otherwise, the video stream is played back.

According to some embodiments, and as mentioned above, ad segments can be inserted into the video stream using ad cues in the manifest file. Each ad cue is resolved by an ad decision server, such as depicted in FIG. 1, into a link, such as a uniform resource locator (URL), to the ad segments provided by the ad provider of FIG. 1. The ad segments can be inserted using the links either by the content server or by the client browser. In some cases, the link may be signed using a cryptographic key (e.g., the same cryptographic key as used to sign the manifest file). If the link is signed, the ad segment is inserted only if the signature is verified using the cryptographic key. When ad insertion is done by the content server, ad cues are resolved when the playlist is dynamically constructed by the manifest packaging unit, and the manifest file includes encrypted ad segments that can be played back directly by the media player. In this case, the client browser has no knowledge that an ad segment is being played (as opposed to a program content segment). To support precise measurement of advertisement viewership, ads may alternatively be inserted by the client browser. In either case, ad removal or modification is prevented by the signed and tamper resistant manifest file.

As will be appreciated in light of this disclosure, the various modules and components, such as the manifest packaging unit, the media player, the DRM unit and the user interface, can be implemented in software, such as a set of instructions (e.g. C, C++, object-oriented C, JavaScript, BASIC, etc.) encoded on any computer readable medium (e.g., hard drive, server, or other suitable memory), that when executed by one or more processors, cause the various methodologies provided herein to be carried out. In other embodiments, the components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number embedded routines for carrying out the functionality described herein. Any suitable combination of hardware, software, and firmware can be used.

Numerous embodiments will be apparent in light of the present disclosure, and features described herein can be combined in any number of configurations. One embodiment provides a digital media processing method. The method includes receiving a manifest file identifying each of a plurality of segments in a video stream. The method further includes storing, in the manifest file, metadata representing a manifest signing enforcement policy including a whitelist of digital media players and/or a blacklist of digital media players, and an encryption key identifier associated with a first cryptographic key. The method further includes encrypting each of the segments using a second cryptographic key and digitally signing the manifest file using the second cryptographic key. In some cases, the first cryptographic key includes an asymmetric public key (e.g., an RSA public key) and the second cryptographic key includes an asymmetric private key (e.g., an RSA private key). In some such cases, the method includes storing the first cryptographic key in the manifest file. In some cases, the first cryptographic key and the second cryptographic key each include a symmetric key. In some cases, the method includes canonicalizing the manifest file prior to digitally signing the manifest file. In some cases, the manifest file further identifies each of a plurality of ad cues associated with the video stream. In some such cases method includes encrypting each of the ad cues using the second cryptographic key. In some cases, the manifest file further identifies each of a plurality of ad cues associated with the video stream. In some such cases, the method includes resolving each of the ad cues into a link pointing to an ad segment, retrieving the ad segment using the link, and encrypting the ad segment using the second cryptographic key. In some cases, the method includes transmitting the digitally signed manifest file to a media player.

Another embodiment provides a digital media processing method. The method includes receiving, by a digital media player, a manifest file identifying each of a plurality of encrypted segments in a video stream. The manifest file has a digital signature corresponding to a cryptographic key. The method further includes extracting, from the manifest file, metadata representing a manifest signing enforcement policy including a whitelist of digital media players and/or a blacklist of digital media players, and an encryption key identifier associated with the cryptographic key. The method further includes determining whether the digital signature of the manifest file is valid using the cryptographic key and the encryption key identifier, and playing back the video stream in response to determining that the digital signature is valid, otherwise preventing the video stream from being played back. In some cases, the method includes extracting the cryptographic key from the manifest file. In some cases, the method includes decrypting each of the encrypted segments using the cryptographic key. In some such specific cases, at least one of the encrypted segments includes an ad segment. In some cases, the manifest file further identifies each of a plurality of encrypted ad cues associated with the video stream. In some such cases, the method may include decrypting each of the ad cues using the cryptographic key. In some such specific cases, the method includes resolving each of the decrypted ad cues into a link pointing to an ad segment and retrieving the ad segment using the link. In some such cases, the link is signed, and the method includes verifying the signature for the link using the cryptographic key. In some cases, the method includes preventing the video stream from being played back if either the digital media player is on the blacklist of digital media players or the digital media player is not on the whitelist of digital media players.

Another embodiment provides a system having a storage and a processor operatively coupled to the storage and configured to receive a manifest file identifying each of a plurality of encoded encrypted segments in a video stream. The manifest file has a digital signature corresponding to a cryptographic key. The processor is further configured to extract, from the manifest file, metadata representing: a manifest signing enforcement policy including a whitelist of digital media players and/or a blacklist of digital media players, and an encryption key identifier associated with the cryptographic key. The processor is further configured to determine whether the digital signature of the manifest file is valid using the cryptographic key and the encryption key identifier, and play back the video stream in response to determining that the digital signature is valid, otherwise preventing the video stream from being played back. In some cases, the processor is configured to extract the cryptographic key from the manifest file. In some cases, the processor is configured to decrypt each of the encrypted segments using the cryptographic key. In some cases, the manifest file further identifies each of a plurality of encoded encrypted ad cues associated with the video stream. In some such cases, the processor may be further configured to decode decrypt each of the encrypted ad cues using the cryptographic key. Yet another embodiment provides a non-transient computer-readable medium or computer program product having instructions encoded thereon that when executed by one or more processors cause the processor to perform one or more of the functions defined in this paragraph.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A digital media processing method comprising:
    receiving an unsigned manifest file having, encoded in a first portion thereof, a plurality of segments in a video stream;
    encoding, in a second portion of the manifest file, metadata representing:
        a manifest signing enforcement policy including at least one of a whitelist of digital media players and a blacklist of digital media players; and
        an encryption key identifier associated with a first cryptographic key;
    encrypting each of the segments using a second cryptographic key; and
    digitally signing the manifest file using the second cryptographic key.

2. The method of claim 1, wherein the first cryptographic key includes an asymmetric public key, wherein the second cryptographic key includes an asymmetric private key, and wherein the method further includes storing the first cryptographic key in the manifest file.

3. The method of claim 1, wherein the first cryptographic key and the second cryptographic key each include a symmetric key.

4. The method of claim 1, further comprising canonicalizing the manifest file prior to digitally signing the manifest file.

5. The method of claim 1, wherein the manifest file further identifies each of a plurality of ad cues associated with the video stream, and wherein the method further comprises encrypting each of the ad cues using the second cryptographic key.

6. The method of claim 1, wherein the manifest file further identifies each of a plurality of ad cues associated with the video stream, and wherein the method further comprises resolving each of the ad cues into a link pointing to an ad segment, retrieving the ad segment using the link, and encrypting the ad segment using the second cryptographic key.

7. The method of claim 1, further comprising transmitting, to a digital media player, the digitally signed manifest file including the encoded whitelist or blacklist of digital media players.

8. A digital media processing method comprising:
    receiving, by a digital media player, a manifest file having, encoded in a first portion thereof, a plurality of encrypted segments in a video stream and, encoded in a second portion thereof, at least one of a whitelist of digital media players and a blacklist of digital media players, the manifest file having a digital signature corresponding to a cryptographic key;
    extracting, from the manifest file, metadata representing:
        a manifest signing enforcement policy including at least one of the whitelist of digital media players and the blacklist of digital media players; and
        an encryption key identifier associated with the cryptographic key;
    determining whether the digital signature of the manifest file is valid using the cryptographic key and the encryption key identifier; and
    playing back the video stream in response to determining that the digital signature is valid, otherwise preventing the video stream from being played back.

9. The method of claim 8, further comprising extracting the cryptographic key from the manifest file.

10. The method of claim 8, further comprising decrypting each of the encrypted segments using the cryptographic key.

11. The method of claim 10, wherein at least one of the encrypted segments includes an ad segment.

12. The method of claim 8, wherein the manifest file further identifies each of a plurality of encrypted ad cues associated with the video stream, and wherein the method further comprises decrypting each of the encrypted ad cues using the cryptographic key.

13. The method of claim 12, further comprising resolving each of the decrypted ad cues into a link pointing to an ad segment and retrieving the ad segment using the link.

14. The method of claim 13, wherein the link is signed, and wherein the method further includes verifying the signature for the link using the cryptographic key.

15. The method of claim 8, further comprising preventing the video stream from being played back if either the digital media player is on the blacklist of digital media players or the digital media player is not on the whitelist of digital media players.

16. A digital media processing system, comprising:
   a storage; and
   a processor operatively coupled to the storage and configured to:
   receive a manifest file having, encoded in a first portion thereof, a plurality of encrypted segments in a video stream and, encoded in a second portion thereof, at least one of a whitelist of digital media players and a blacklist of digital media players, the manifest file having a digital signature corresponding to a cryptographic key;
   extract, from the manifest file, metadata representing:
      a manifest signing enforcement policy including at least one of the whitelist of digital media players and the blacklist of digital media players; and
      an encryption key identifier associated with the cryptographic key;
   determine whether the digital signature of the manifest file is valid using the cryptographic key and the encryption key identifier; and
   play back the video stream in response to determining that the digital signature is valid, otherwise preventing the video stream from being played back.

17. The method of claim 16, wherein the processor is further configured to extract the cryptographic key from the manifest file.

18. The system of claim 16, wherein the processor is further configured to decrypt each of the encrypted segments using the cryptographic key.

19. The system of claim 16, wherein the manifest file further identifies each of a plurality of encrypted ad cues associated with the video stream, and wherein the processor is further configured to decrypt each of the encrypted ad cues using the cryptographic key.

20. The system of claim 16, wherein the processor is further configured to prevent the video stream from being played back if either (a) a digital media player that received the manifest file is on the blacklist of digital media players or (b) the digital media player is not on the whitelist of digital media players.

* * * * *